US012160943B1

(12) United States Patent
     Law

(10) Patent No.: US 12,160,943 B1
(45) Date of Patent: *Dec. 3, 2024

(54) SYSTEM AND METHOD OF VEHICLE HEADLAMP CONTROL

(71) Applicant: Calvin Law, Chino, CA (US)

(72) Inventor: Calvin Law, Chino, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/632,266

(22) Filed: Apr. 10, 2024

Related U.S. Application Data

(63) Continuation of application No. 18/505,095, filed on Nov. 8, 2023, now abandoned.

(51) Int. Cl.
| | | |
|---|---|---|
| *H05B 47/19* | (2020.01) | |
| *B60Q 1/04* | (2006.01) | |
| *B60Q 1/34* | (2006.01) | |
| *H05B 47/155* | (2020.01) | |
| *H05B 47/16* | (2020.01) | |
| *H05B 47/165* | (2020.01) | |
| *H05B 47/18* | (2020.01) | |

(52) U.S. Cl.
CPC .............. *H05B 47/19* (2020.01); *B60Q 1/04* (2013.01); *B60Q 1/34* (2013.01); *H05B 47/155* (2020.01); *H05B 47/16* (2020.01); *H05B 47/165* (2020.01); *H05B 47/18* (2020.01); *B60Q 2400/20* (2013.01); *B60Q 2400/30* (2013.01)

(58) Field of Classification Search
CPC ...... H05B 47/19; H05B 47/155; H05B 47/16; H05B 47/165; H05B 47/18; B60Q 1/04; B60Q 1/34; B60Q 2400/20; B60Q 2400/30
See application file for complete search history.

(56) References Cited

U.S. PATENT DOCUMENTS

| | | | |
|---|---|---|---|
| 9,580,009 B1 * | 2/2017 | Lenker | B60Q 1/52 |
| 2010/0076642 A1 * | 3/2010 | Hoffberg | G06V 40/103 |
| | | | 715/728 |
| 2011/0195699 A1 * | 8/2011 | Tadayon | H04B 5/77 |
| | | | 455/418 |
| 2017/0158118 A1 * | 6/2017 | Lenker | B62J 6/057 |

FOREIGN PATENT DOCUMENTS

| | | | | |
|---|---|---|---|---|
| DE | 102013006186 A1 * | 10/2014 | | B60Q 1/28 |
| KR | 20210151115 A * | 12/2021 | | B60Q 1/28 |

* cited by examiner

*Primary Examiner* — Abdullah A Riyami
*Assistant Examiner* — Syed M Kaiser
(74) *Attorney, Agent, or Firm* — Alexander Chen, Esq.

(57) ABSTRACT

A vehicle lamp system and method with adjustable lights that are configurable and configured to display a variety of colors and blinking patterns. Moreover, the lamp comprises a mobile user interface that commands the lights wirelessly, receives light status from the physical lights, and displays and animates the lights in real time.

13 Claims, 12 Drawing Sheets

SYSTEM AND METHOD OF VEHICLE HEADLAMP CONTROL

INCORPORATION BY REFERENCE

This application is a continuation application of and claims the benefit of earlier filing date under 35 U.S.C. 120 to the filing date of U.S. application Ser. No. 18/505,095, entitled "Apparatus And Method Of Vehicle Headlamp Control Device," filed on Nov. 8, 2023, and which is incorporated herein by reference in its entirety.

FIELD OF INVENTION

The present invention is a smart headlamp lighting control system and method that allow a user to modify the color, blinking rate, and lighting pattern of the various lights of a vehicle.

BACKGROUND

The aftermarket, or the secondary market, of automotive parts and equipment, is concerned with the manufacturing, re-manufacturing, distribution, retailing, and installation of all vehicle parts, chemicals, equipment, and accessories, after the sale of the automobile by the original equipment manufacturer (OEM) to the consumers. The purchase of such aftermarket parts is a popular way for automobile enthusiasts to personalize their vehicles.

One of the most popular vehicle personalization is the replacement of vehicle lamps. As a result, aftermarket lamps are popular parts. While the color of the lights in the lamp, from the running and primary lights (white or selective yellow) and blinkers (amber), are subject to regulation, there is still room for some adaptation to permit vehicle personalization. However, it has heretofore been a complicated process for the user to modify and manage such personalization.

Thus, it is desirable for a solution both for the control box appended to the headlamp and a mobile user interface to customize the headlamp. In addition, the mobile user interface is advanced such that it displays the feedback from the lamps so the user can have visual confirmation of the actual lamp color display.

OBJECTIVE OF THE INVENTION

It is an object of this invention to provide a user-friendly mobile interface for the user to easily modify and manage the color, rate, and pattern of each vehicle lamp.

It is also an object of this invention to provide a user-friendly mobile interface for the user to easily see real-time images of vehicle lamps.

It is an object of this invention to create a solution for the control box appended to headlamps to regulate the color, rate, and pattern of each light therein.

It is a further object of this invention to prevent the user from violating any vehicle lighting laws while in motion.

It is a further object of this invention to provide music data, which commands the color, rate, and pattern of the headlamp according to a pre-determined algorithm.

SUMMARY OF THE INVENTION

The present invention is an innovative pattern-light lamp system that comprises a lamp unit, and a control box, and the lamp unit connects to the control box wiredly or wirelessly. The system also has a mobile user interface ("UI") application that connects wirelessly to the control box via Bluetooth or Wi-Fi. The mobile UI application gives instructions to the control box, which in turn gives commands to the lamp unit, and the control box sends the light status back to the mobile UI application which displays the light status in real time. The lamp unit comprises an adjustable light blinking rate component that controls how lights blink and blinking speed, a light pattern component that controls light patterns, and a light color component that controls light colors. The control box comprises an adjustable light blinking rate control unit that commands the light blinking rate component, a light pattern control unit that commands the light pattern component, and a light color control unit that commands the light color component. The mobile UI application further comprises an adjustable light blinking rate module that commands the adjustable light rate control unit, a light pattern module that commands the light pattern control unit, and a light color module that commands the light color control unit.

In an embodiment of the current invention, the mobile UI application further comprises a software download module that permits a user to acquire new light colors, new light color control units, or new light color modules; new light blinking rates, new light blinking rate units, or new light blinking rate modules; or new light patterns, new light pattern units, or new light pattern modules.

In another embodiment of the current invention, the mobile UI application further comprises a global positioning software (GPS) module that gathers local traffic laws and builds dynamic filters that filter out illegal light patterns.

In another embodiment of the current invention, the control box comprises a GPS component.

In another embodiment of the current invention, the lamp system further comprises upper and lower daylight running lights, upper and lower primary lights, and turn signal lights.

In another embodiment of the current invention, the control box further comprises a sequence control unit that permits a user to design a sequence of the light color control unit, light pattern control unit, and light blinking rate control unit; wherein the sequence control unit communicates with the mobile UI application.

In one aspect of the invention, a system for controlling the flashing sequence of a daylight running light of a vehicle headlight comprising a vehicle headlight comprising a daylight running light; a mobile computing device comprising one or more processors, the one or more processors executing an application embedded within the mobile computer device, the application comprising: a viewing module displaying a graphic illustration of the vehicle headlight having the daylight running light; one or more user selectable buttons to active the flashing sequence of the daylight running light; wherein one activated the flashing sequence of the daylight running light is also graphically illustrated on the graphic illustration.

BRIEF DESCRIPTION

The present invention will be understood and appreciated more fully from the following detailed description taken in conjunction with the drawings in which.

DETAILED DESCRIPTION

The invention will be described in the context of a preferred embodiment.

The vehicle headlamp uses a control box (or circuit board) and includes a unique user interface. The user interface comes in the form of a mobile application that allows the user to choose the color as well as the light-up or blinking pattern (e.g., sequential light-up), a user-devised schedule for color, rate, and pattern for each of the various lights within the headlamp, which can be based upon music.

Figure 1:
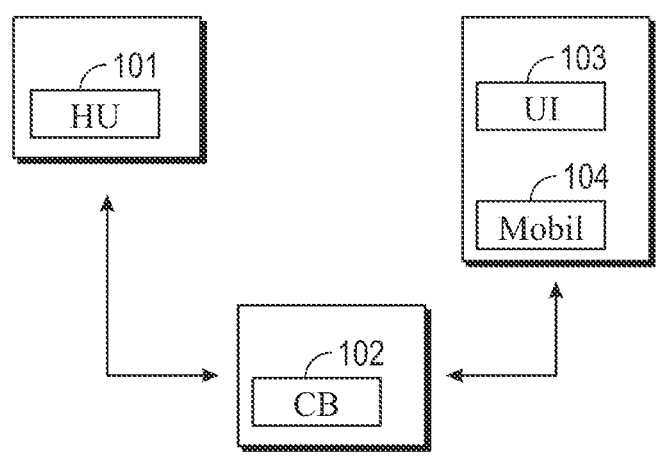
FIG. 1 illustrates a block diagram of the three components of the invention: headlamp, control box, and mobile user interface.

FIG. 1 illustrates a block diagram showing how the three components of the invention connect and interact. The headlamp unit 101 connects to the control box 102, which connection can be wired or wireless (in this embodiment it is wired). The control box 102 then connects wirelessly through Bluetooth or Wi-Fi technology to the mobile user interface 103, which in the preferred embodiment exists in the form of an application downloaded onto the user's mobile phone 104. The control box 102 gives instruction from the mobile 104 user interface 103 to the headlamp 101.

Figure 2:
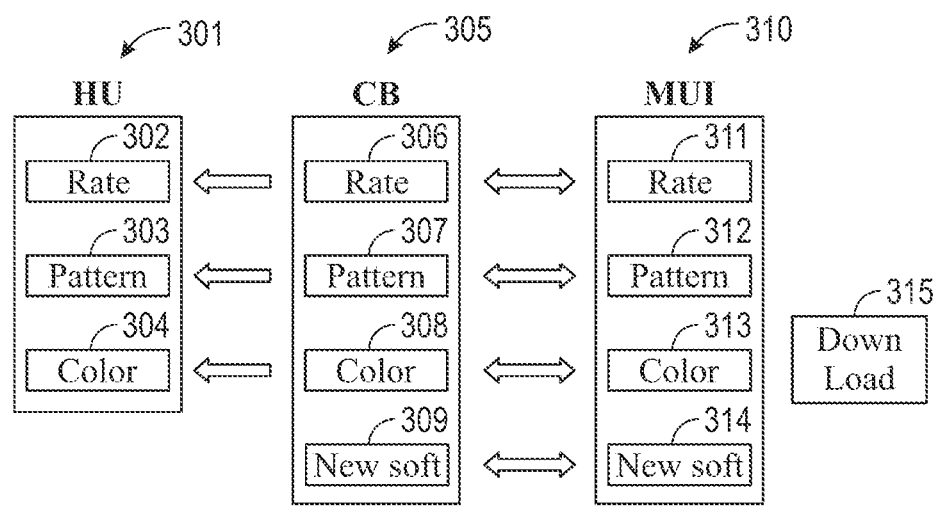
FIG. 2 illustrates a block diagram of the adjustable portions of each of the three components of the invention.

FIG. 2 illustrates a block diagram showing the adjustable portions of each of the three components: rate, pattern, and color of the lamp, and the UI software modules that control each component. The headlamp 301 contains adjustable light rate 302 (how it blinks, e.g. 1× per second, 10× per second), light pattern 303 (e.g., blink or sequential light-up), and light color 304, the instructions for which come from the control box 305. The control box 305 contains a circuit board and embedded firmware that comprises adjustable light rate 306, light pattern 307, and light color 308, and a firmware module 309 for updating the functions and data of the three components 306, 307, and 308, and the instructions for which come from the mobile user interface 310. Besides the adjustable light rate module 311, light pattern module 312, and light color module 313, the mobile user interface further comprises a software 314 download module 315, which permits the user to acquire light rates for module 311, light patterns for module 312, and colors for module 313.

Figure 3:
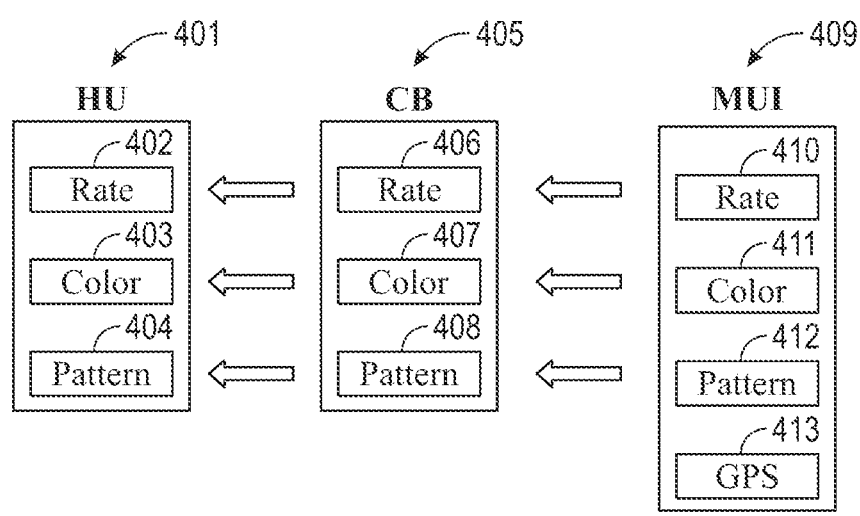
FIG. 3 illustrates a block diagram of the mobile user interface coupled with the software download module.

FIG. 3 illustrates a block diagram that introduces a global positioning software (GPS) module 413 into the mobile user interface 409. The GPS 413 prevents the user from violating any vehicle lighting laws by prohibiting any potentially illegal combinations of light rate 410, color 411, and pattern 412 while the vehicle is moving. The mobile user interface is shown connecting to the control box 405, which itself contains light rate 406, color 407, and pattern 408. The headlamp unit 301 is again shown with adjustable light rate 402, light color 403, and light pattern 404.

The current invention comprises an innovative mobile user interface that comprises an advanced graphical interface (GUI) that animates the real-time showing of the light blinking rate, pattern, and color of the vehicle lamp so that the user can view the current showing of the lamps disposed externally from anywhere, even inside the vehicle, within the communication distance between the control box and mobile user interface.

Figure 4:
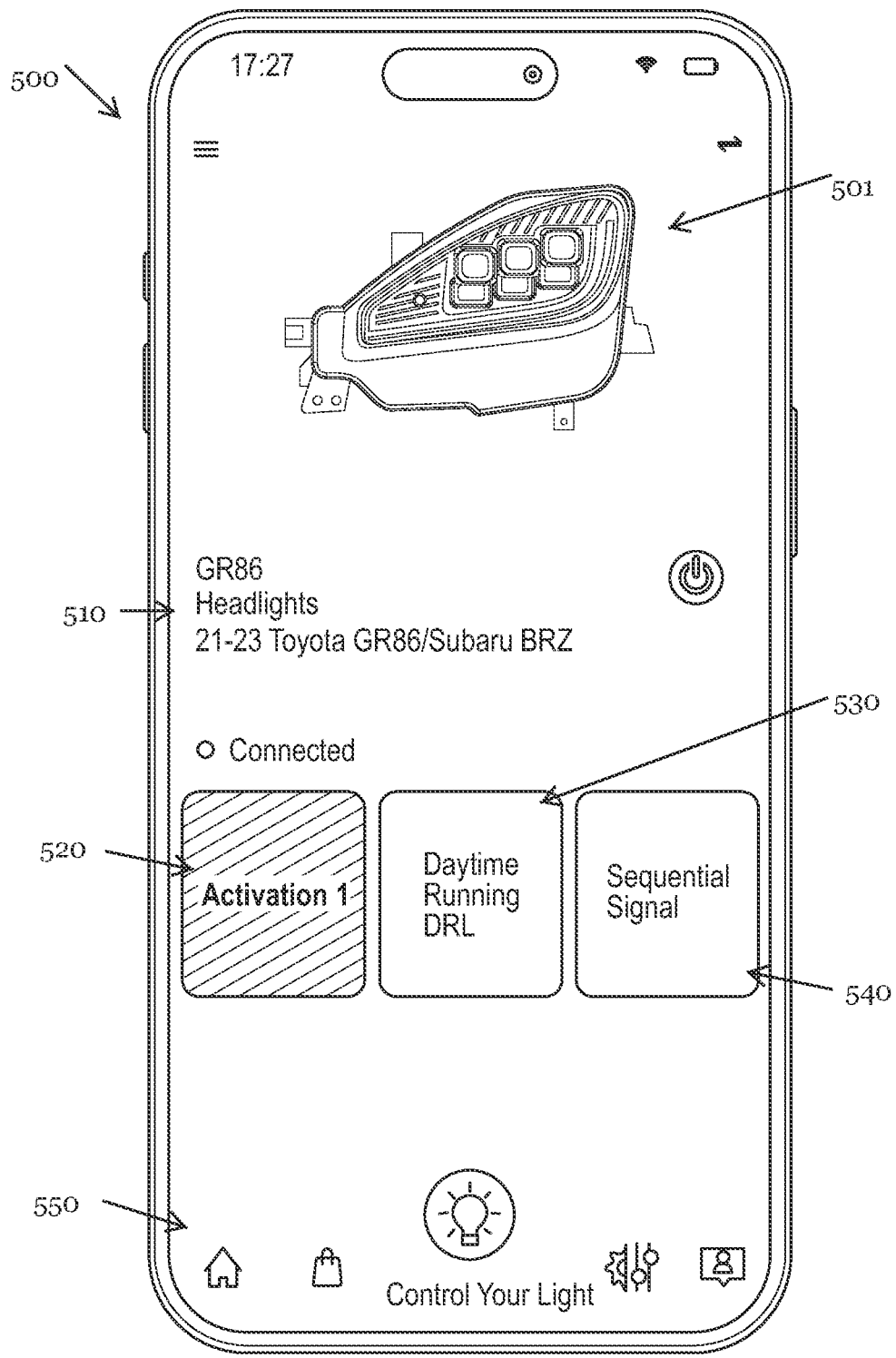
FIG. 4 illustrates an exemplary user interface of the current invention, and its elements.

FIG. 4 illustrates another embodiment 500 of the current invention where the GUI comprises an animated graphical display 501 of the vehicle lamp, the lamp's information label 510, the Activation button 520, the Daytime Running Light (DRL) button 530, and the Sequential Signal button 540, and the menu bar 550 at the bottom and spreading across the width of the GUI. The button DRL functions to enable different modes of the DRL lights in the lamp. The Sequential button functions to enable different blinking patterns of the lights. And the Activation button functions to start a selected mode.

Figure 5:
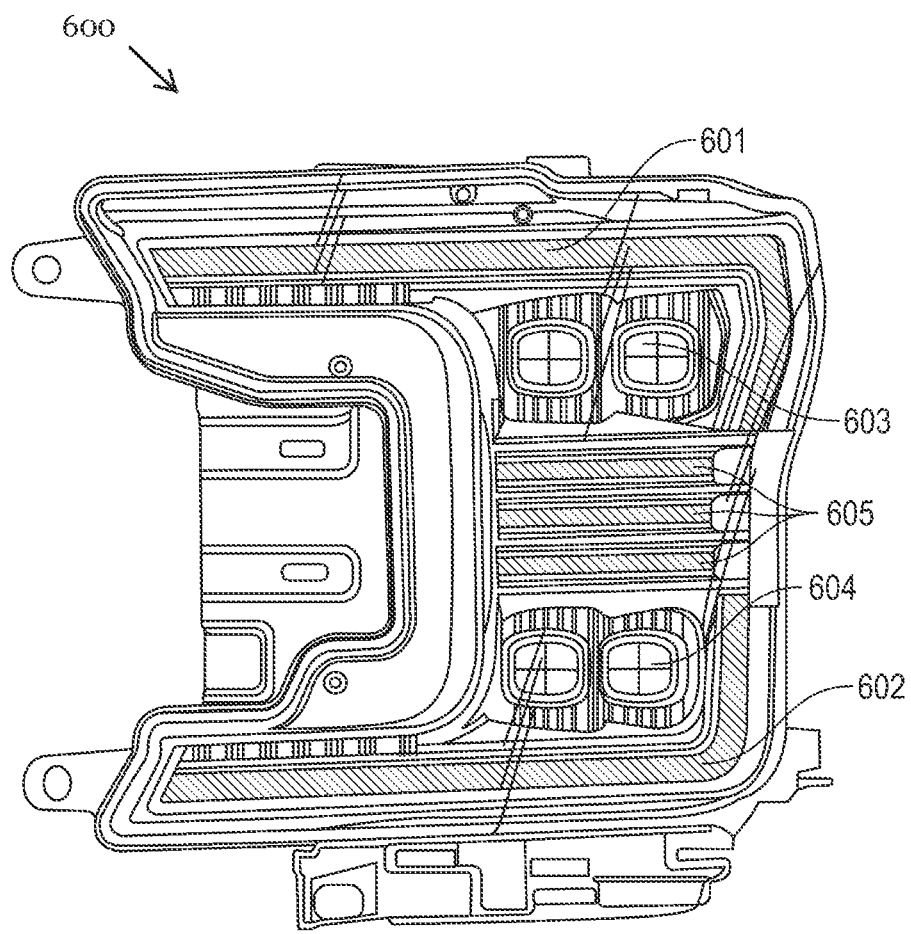
FIG. 5 illustrates the headlamp component of the invention and the various types of lights therein for which the color may be modified separately.

FIG. 5 focuses on an exemplary animated graphical display 600 of a typical vehicle lamp. The GUI displays, among other elements of a headlamp, the upper and lower daylight (DRL) display elements 601 and 602. It also displays the upper and lower primary light display elements 603 and 604, as well as the turn signal light display elements 605. Since the virtual light display elements in the GUI are the true real-time representation of the physical lights in the vehicle lamps, the disclosure of the display elements' functions and patterns is hereinafter interchangeable to that of the corresponding lights in the lamps and must be construed to disclose both the physical lights and their representation in the GUI.

The previously disclosed DRL button is used to change the modes of the upper and lower DRL display elements 601 and 602. The Sequential button is used to change the blinking patterns of all the lights. When the Activation button is pressed, the control box causes the selected light or lights to light up in the selected patterns and colors and concurrently communicates the real-time showing of the lights back to the GUI so that the GUI animates the lights' showing on the graphical display 600.

Figure 6:
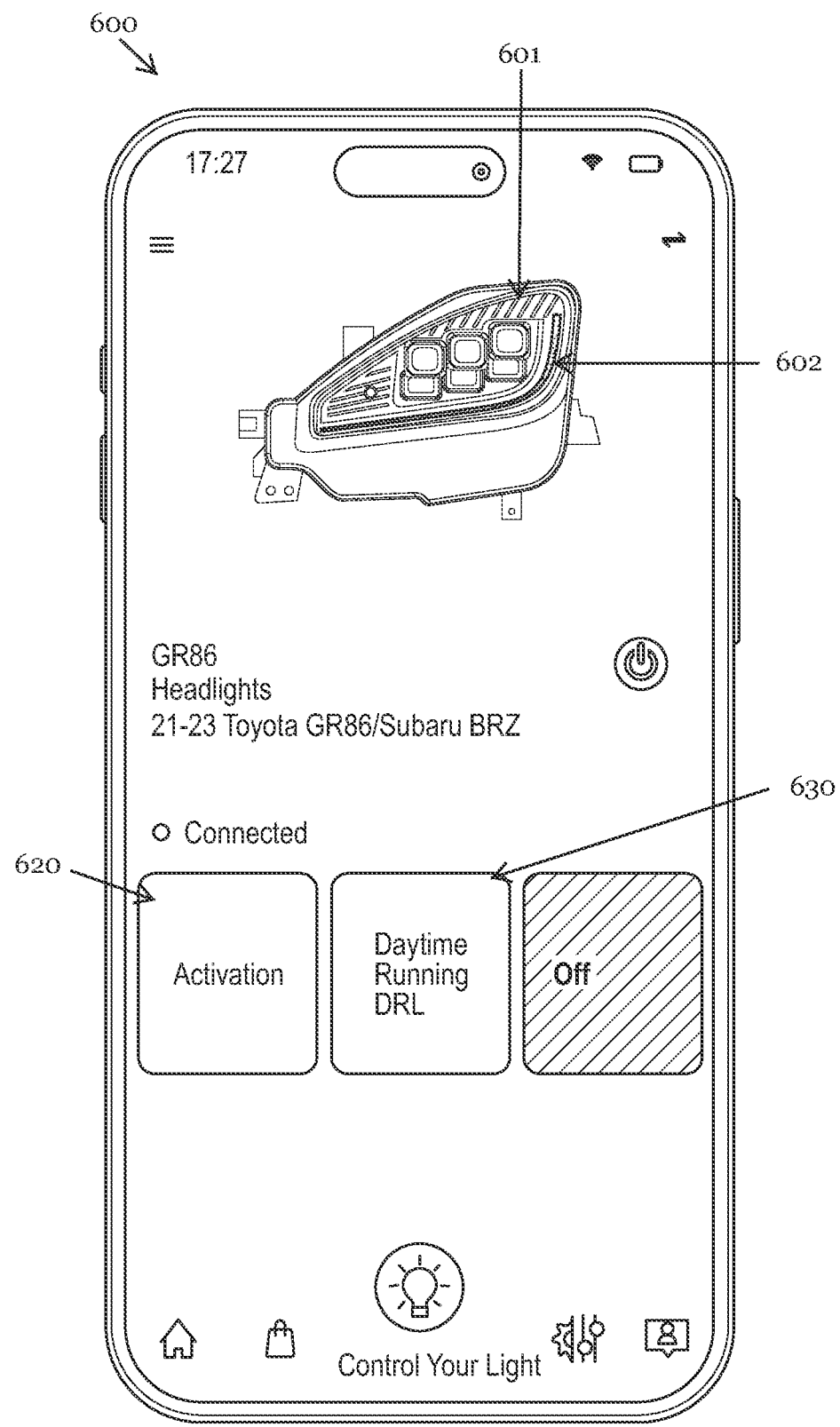
FIGS. 6-7 illustrate one of the modes of operation of the headlamp and the user interface where the DRL is selected and the Activation button is pressed.
Figure 7:
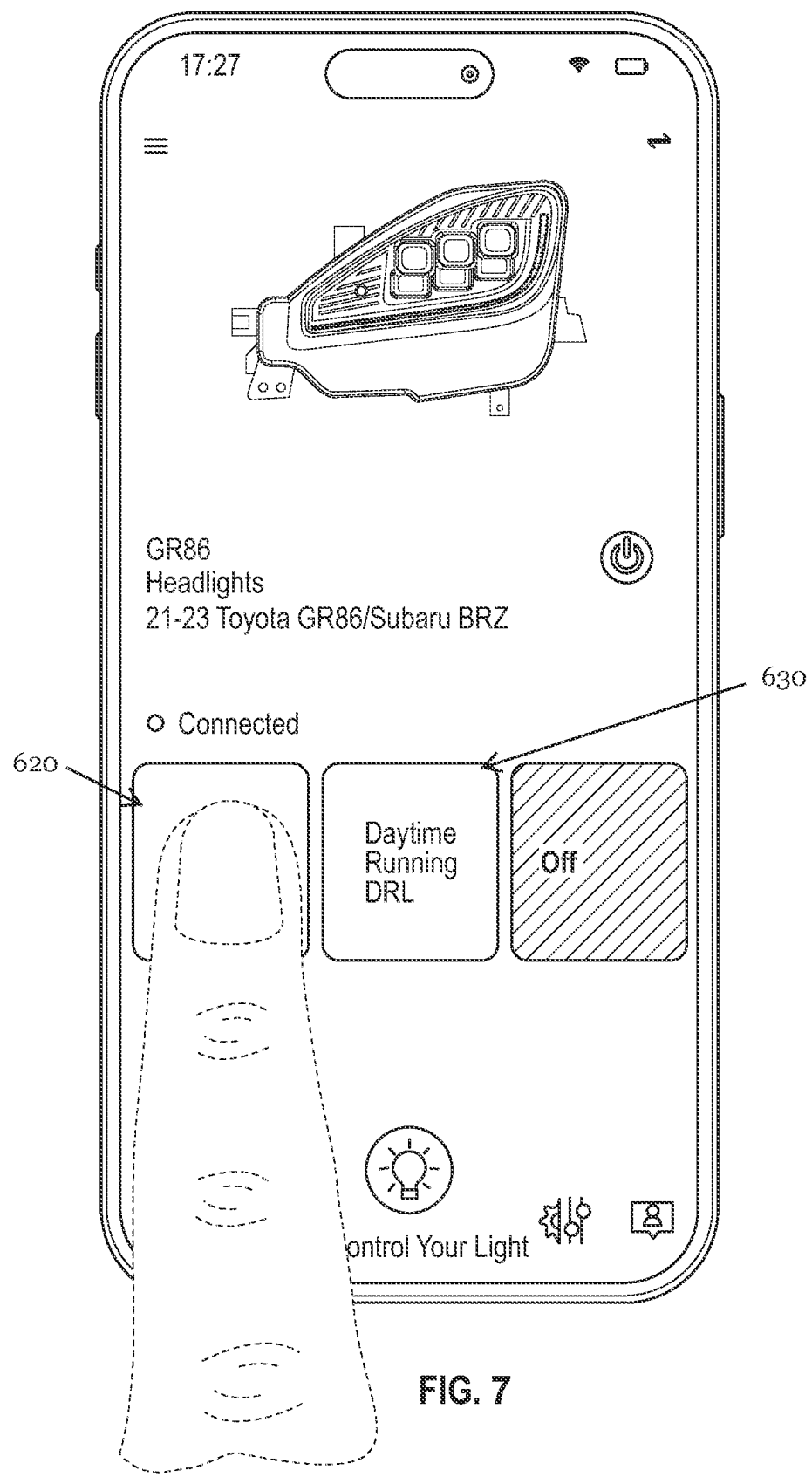

FIGS. 6 and 7 illustrate another embodiment 600 of the current invention where the DRL button 630 is selected, and, thus, the DRL of the vehicle lamp and their display elements 601 and 602 are selected. The colors of the lights are represented on the graphical display 600. If the lights are in a sequential display mode, i.e. individual light is lit up one after the last from left to right, the display elements are animated with the same pattern. In other words, the graphical display 600 is a real-time animation of the vehicle lights. The DRL lights and animated display elements 601 and 602 are operative when the Activation button 620 is pressed.

Where the Sequential button 640 is not selected, i.e. off, the DRLs are lit up in a solid pattern similar to the usual primary headlights. However, the current invention can control the lights to display different pre-programmed patterns other than the traditional solid white light. The different sequential patterns are disclosed below.

Figure 8:
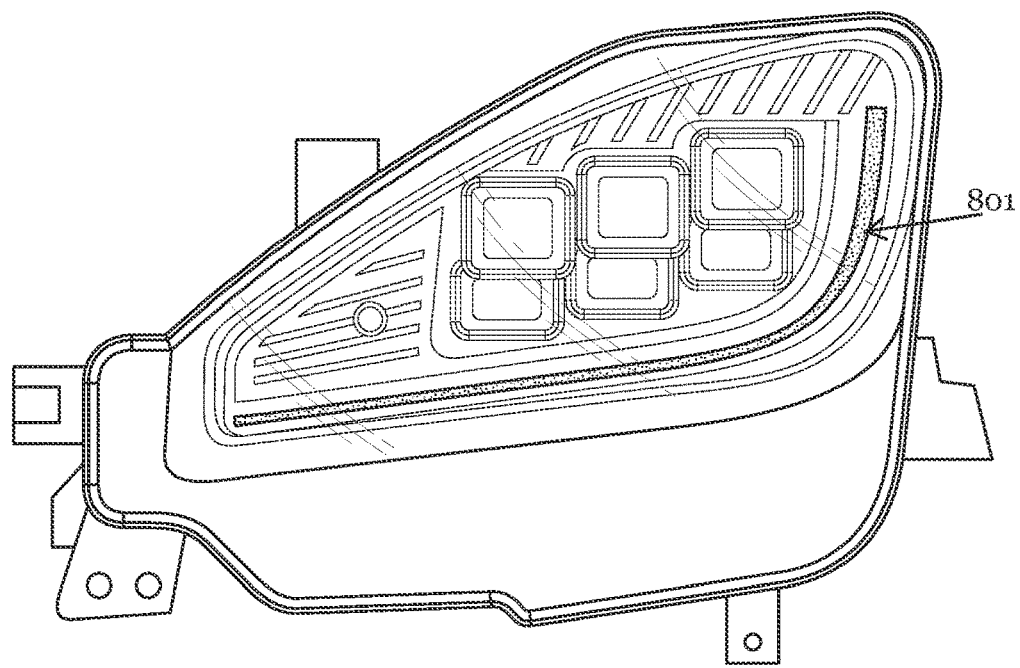
FIG. 8 illustrates another mode of operation of the headlamp and the user interface where the first sequential blinking pattern is selected.
Figure 8:
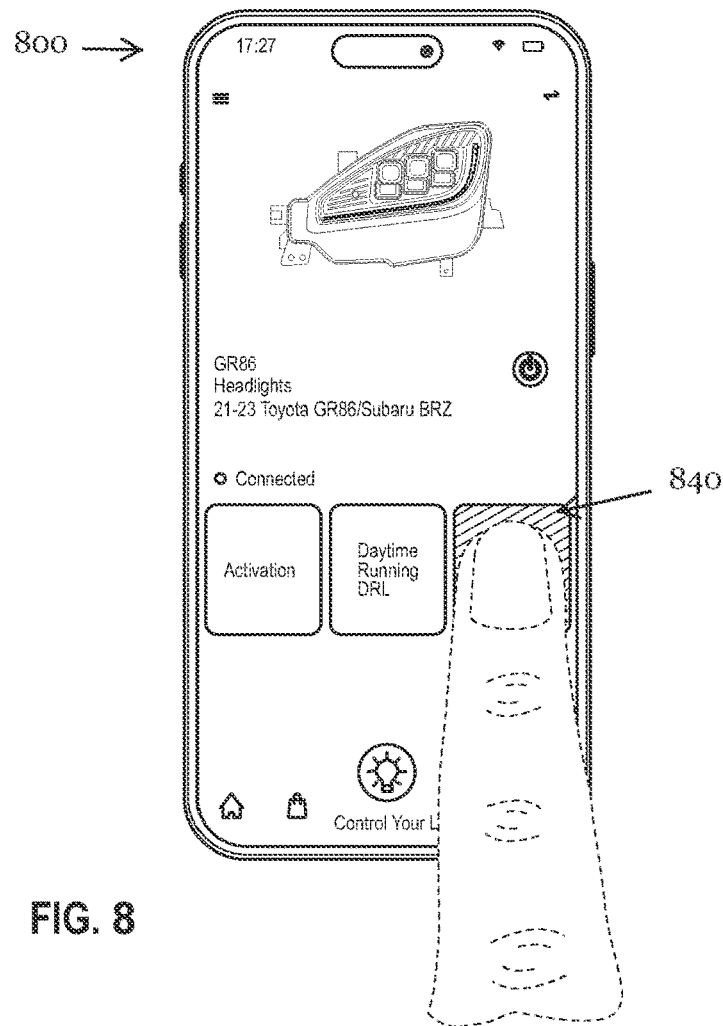

FIG. 8 illustrates another embodiment 800 of the current invention where the Sequential button 840 is pressed. The DRLs 801 are disposed in curvature panels. The Sequential button has multiple states corresponding with multiple light patterns. The user cycles through different states/patterns by pressing the button 840 again until the desired pattern is selected. FIG. 8 illustrates the first exemplary pattern where all DRLs blink at a pre-configured rate, e.g. 10, 20, or 30-second interval.

Figure 9:
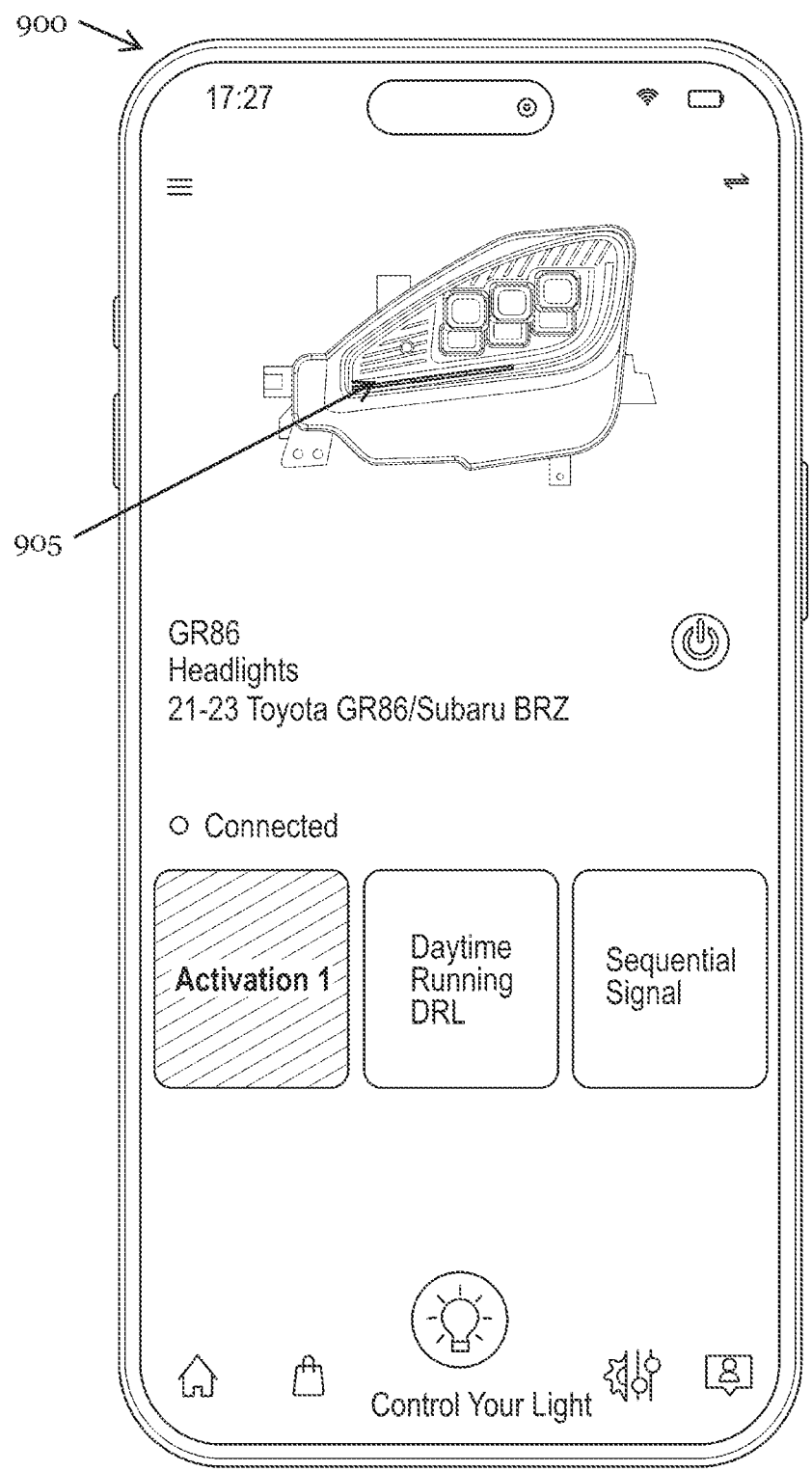
FIGS. 9-11 illustrate the three displays of the sequential blinking pattern selected in FIG. 8.
Figure 10:
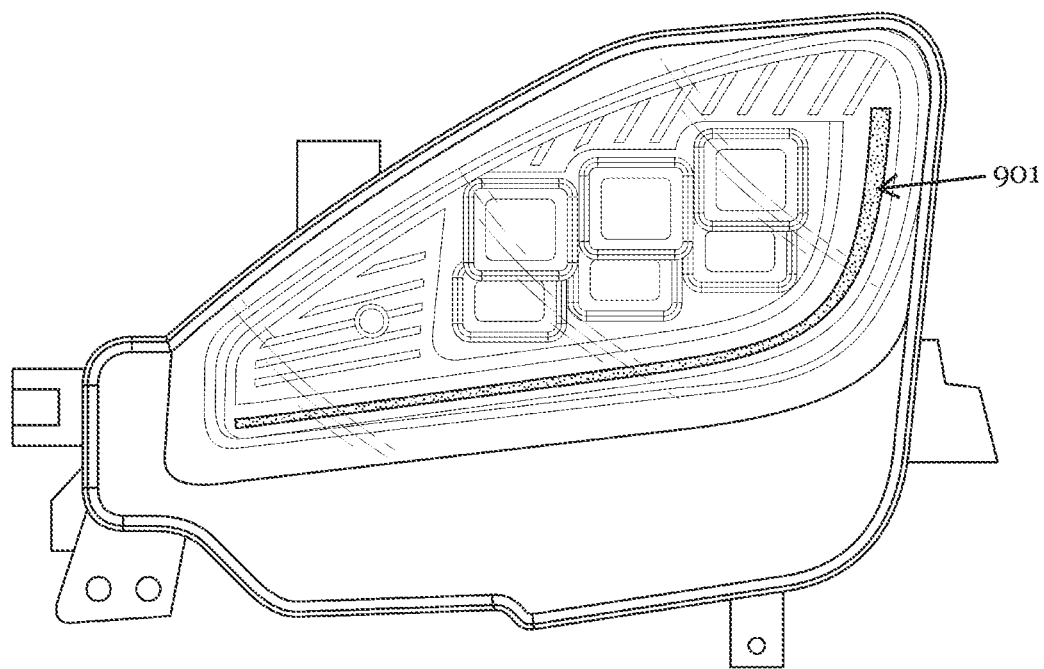
Figure 10:
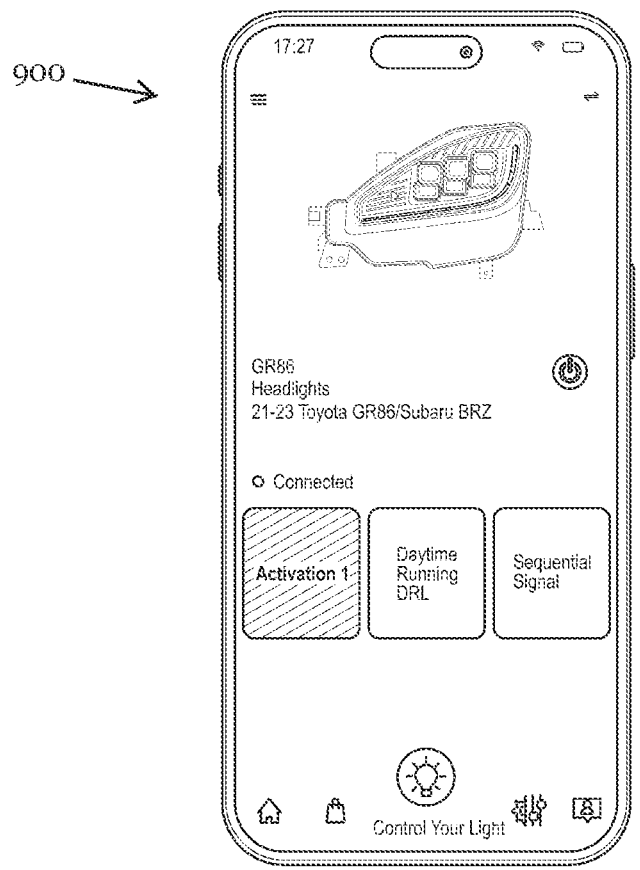
Figure 11:
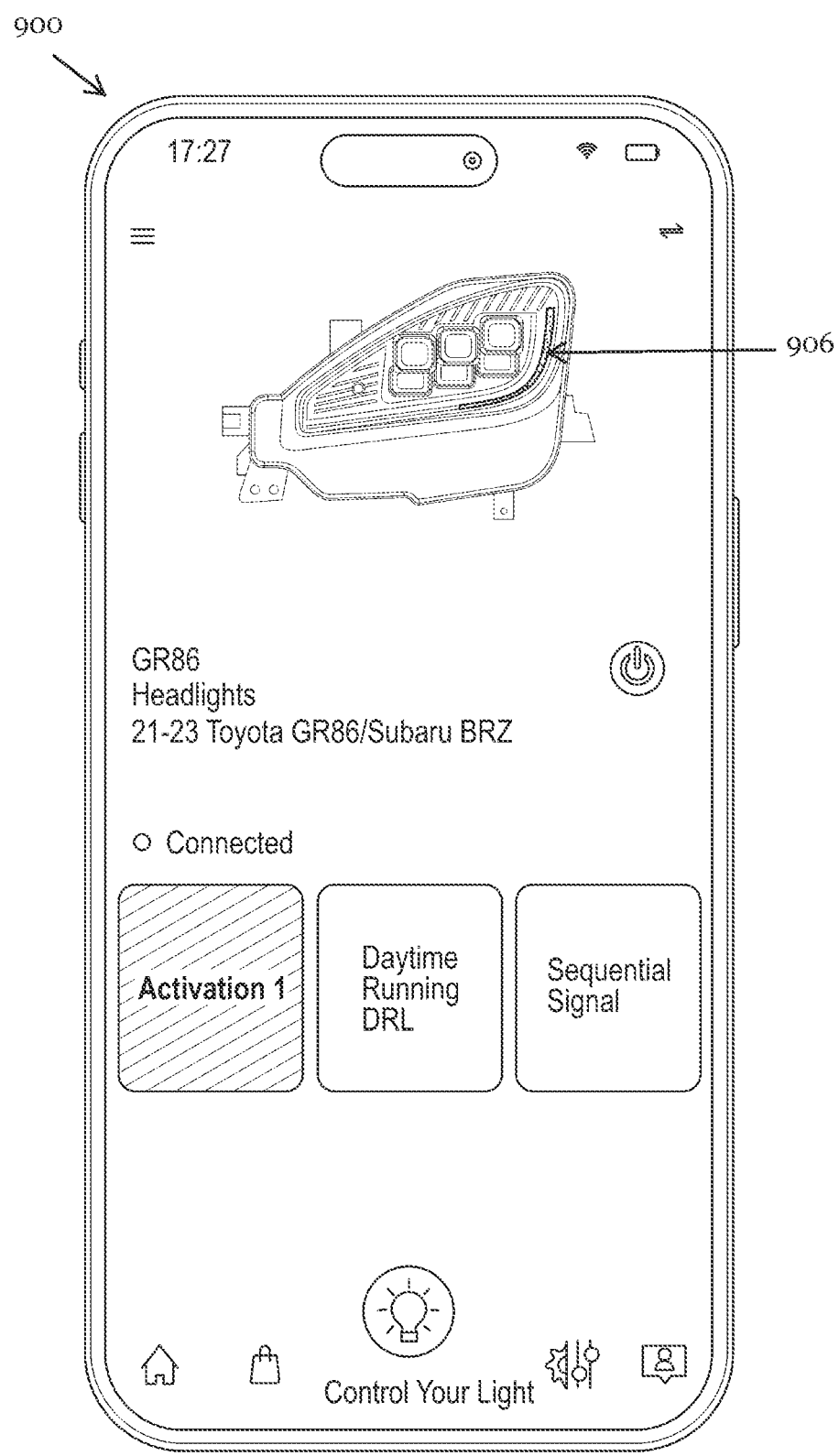

FIGS. 9-11 illustrate another embodiment 900 of the current invention where the user presses the Sequential button 840 again to select the next pattern. In this embodiment, the pattern is a sequential display of groups of DRL lights at a slow-changing speed. The DRLs in this embodiment are grouped into two groups: left and right halves. When the slow sequential pattern starts, the left half 905 is lit up for a pre-defined duration. Then, the right half 906 is lit up, and so is the whole DRL panel 901 for a pre-defined duration. Then, the left half 905 is turned off while the right half 906 stays on for another pre-defined duration. Then, the pattern is repeated. It is contemplated that the number of light groups, the order in which the light groups are lit up, and the pre-defined durations are individually configurable.

The light patterns also comprise a faster sequential blinking pattern where the left half is lit up for a pre-defined duration. Then, the entire DRL panel is lit up, and the pattern is repeated. It is also contemplated that the turn-signal lights can have similar blinking patterns in locations where blinking brake lights do not violate local laws.

Figure 12:
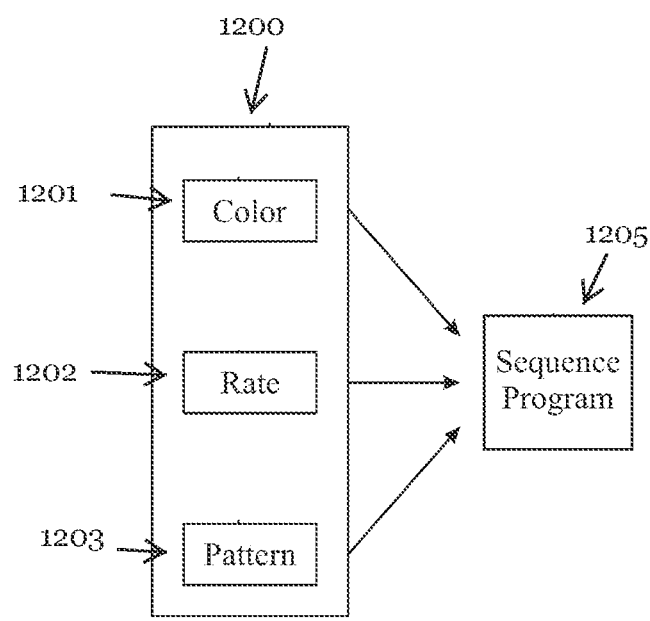
FIG. 12 illustrates a sequence program module in the mobile user interface.

FIG. 12 illustrates a sequence program module 1205 permitting the user to design a sequence of all three modifiers, color 1201, blinking rate 1202, and pattern 1203, instead of changing each one at a time. The sequence program module 905 connect to the mobile user interface 1200.

The invention claimed is:

1. A pattern-light lamp system comprising:
a lamp unit;
a control box, wherein said lamp unit connects to said control box with at least one of wired or wireless method;
a mobile user interface ("UI") application, wherein said mobile UI application connects wirelessly to said control box; wherein said mobile UI application gives instructions to said control box, which in turn gives commands to said lamp unit; wherein said control box sends light status back to said mobile UI application which displays light status in real time;
wherein said lamp unit comprises an adjustable light blinking rate component that controls how lights blink and blinking speed, a light pattern component that controls light patterns, and a light color component that controls light colors;
wherein said control box further comprises an adjustable light blinking rate control unit that commands said light blinking rate component, a light pattern control unit that commands said light pattern component, and a light color control unit that commands said light color component;
wherein said mobile UI application further comprises an adjustable light blinking rate module that commands said adjustable light rate control unit, a light pattern module that commands said light pattern control unit, and a light color module that commands said light color control unit;
wherein said adjustable light blinking rate control unit, said light pattern control unit, and said light color control unit are updatable;
wherein said adjustable light blinking rate module, said light pattern module, and said light color module are updatable.

2. The lamp system of claim 1, wherein said mobile UI application further comprises a software download module that permits a user to acquire at least one of new light colors, new light color control units, and new light color modules; new light blinking rates, new light blinking rate units, and new light blinking rate modules; and new light patterns, new light pattern units, and new light pattern modules.

3. The lamp system of claim 1, wherein said mobile UI application further comprises a global positioning software (GPS) module that gathers local traffic laws and builds dynamic filters that filter out illegal light patterns.

4. The lamp system of claim 1, wherein said control box comprises a GPS component.

5. The lamp system of claim 1 further comprises upper and lower daylight running lights, upper and lower primary lights, and turn signal lights.

6. The lamp system of claim 1, wherein said control box further comprises a sequence control unit that permits a user to design a sequence of said light color control unit, said light pattern control unit, and said light blinking rate control unit; wherein said sequence control unit communicates with said mobile UI application.

7. A method for a pattern-light lamp system comprising:
providing a lamp unit;
providing a control box;
connecting said lamp unit to said control box with at least one of wired or wireless method;
providing a mobile user interface ("UI") application that wirelessly connects to said control box; wherein said mobile UI application gives instructions to said control box, which in turn gives commands to said lamp unit;
wherein said control box sends light status back to said mobile UI application which displays light status in real time;
wherein said lamp unit comprises an adjustable light blinking rate component that controls how lights blinking and blinking speed, a light pattern component that controls light patterns, and a light color component that controls light colors;
wherein said control box further comprises an adjustable light blinking rate control unit that commands said light blinking rate component, a light pattern control unit that commands said light pattern component, and a light color control unit that commands said light color component;
wherein said mobile UI application further comprises an adjustable light blinking rate module that commands said adjustable light rate control unit, a light pattern module that commands said light pattern control unit, and a light color module that commands said light color control unit;
wherein said adjustable light blinking rate control unit, said light pattern control unit, and said light color control unit are updatable;
wherein said adjustable light blinking rate module, said light pattern module, and said light color module are updatable.

8. The method of claim 7, wherein providing a software download module that permits a user to acquire at least one of new light colors, new light color control units, and new light color modules; new light blinking rates, new light blinking rate units, and new light blinking rate modules; and new light patterns, new light pattern units, and new light pattern modules.

9. The method of claim 7, wherein providing a global positioning software (GPS) module that gathers local traffic laws and builds dynamic filters that filter out illegal light patterns.

10. The method of claim 7, wherein said control box comprises a GPS component.

11. The method of claim 7, wherein said lamp unit further comprises upper and lower daylight running lights, upper and lower primary lights, and turn signal lights.

12. The method of claim 7, wherein providing a sequence control unit that permits a user to design a sequence of said light color control unit, said light pattern control unit, and said light blinking rate control unit; wherein said sequence control unit communicates with said mobile UI application.

13. A system for controlling a flashing sequence of a daylight running light of a vehicle headlight comprising:
 i. a vehicle headlight comprising a daylight running light;
 ii. a mobile computing device comprising one or more processors, the one or more processors executing an application embedded within said mobile computer device, said application comprising:
 iii. a viewing module displaying a graphic illustration of said vehicle headlight having said daylight running light;
 iv. one or more user selectable buttons to active said flashing sequence of said daylight running light;
 v. wherein one activated said flashing sequence of said daylight running light is also graphically illustrated on said graphic illustration.

\* \* \* \* \*